Dec. 1, 1931.　　　J. B. HENDERSON　　　1,834,341
GYROSCOPIC INSTRUMENT AND APPARATUS
Original Filed Nov. 30, 1920　2 Sheets-Sheet 1
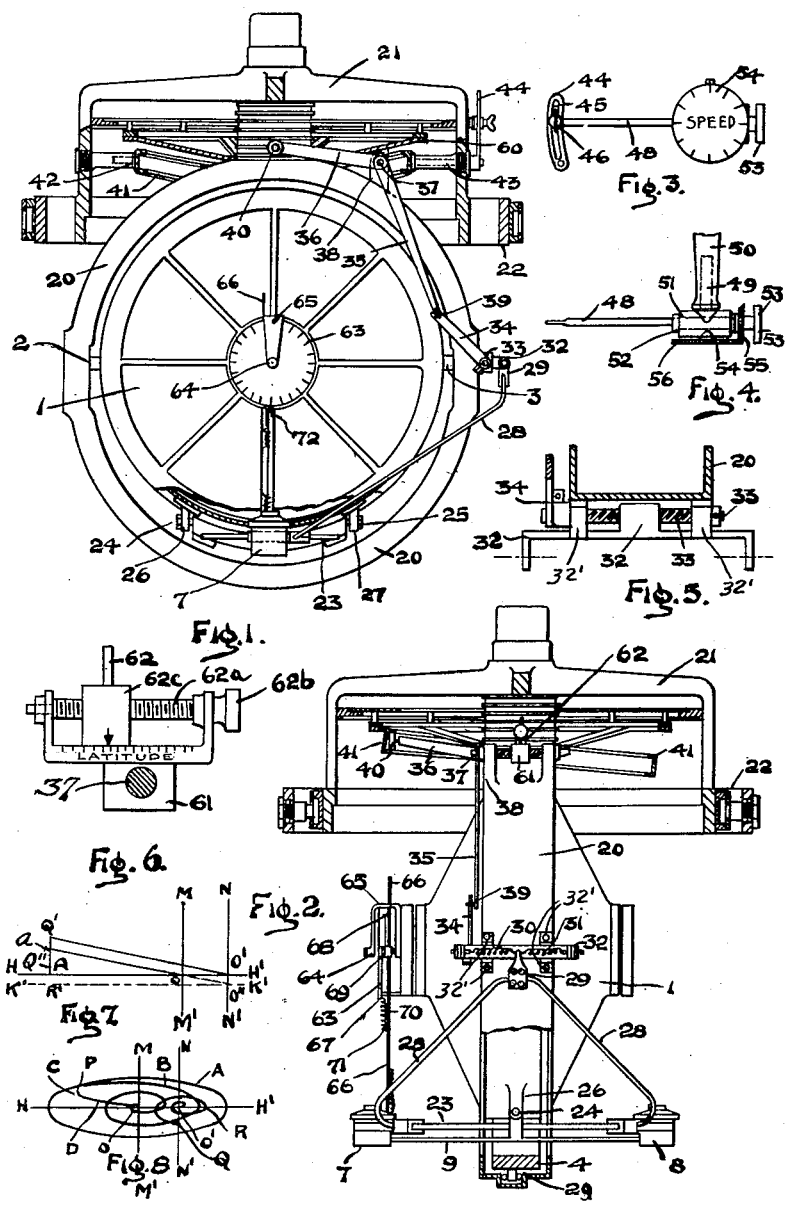
Inventor
James Blacklock Henderson.

Dec. 1, 1931.  J. B. HENDERSON  1,834,341
GYROSCOPIC INSTRUMENT AND APPARATUS
Original Filed Nov. 30, 1920   2 Sheets-Sheet 2
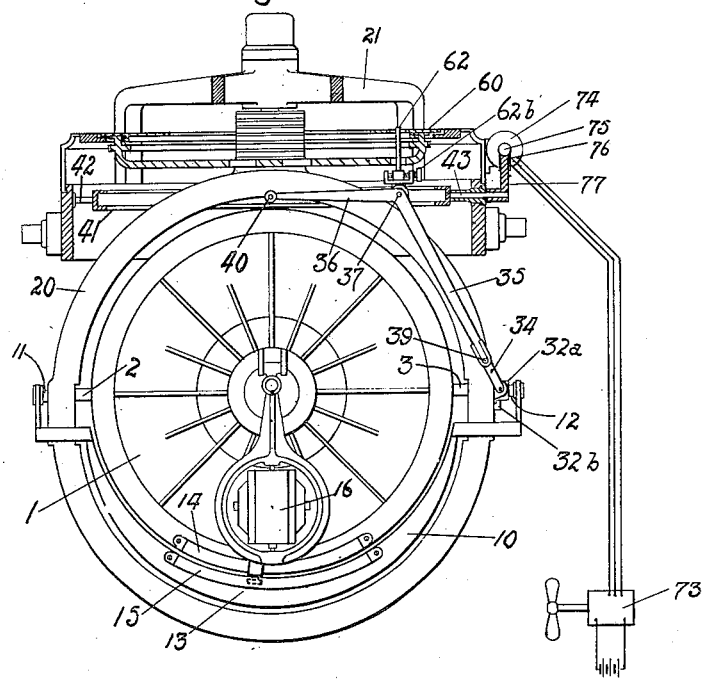
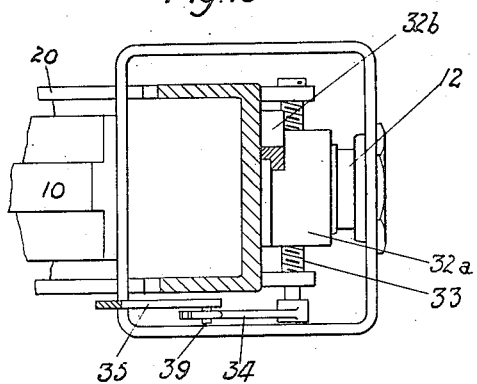
JAMES B. HENDERSON
INVENTOR
BY Moakley and Gill
ATTORNEYS Patented Dec. 1, 1931

1,834,341

UNITED STATES PATENT OFFICE

JAMES BLACKLOCK HENDERSON, OF BLACKHEATH, ENGLAND

GYROSCOPIC INSTRUMENT AND APPARATUS

Application filed November 30, 1920, Serial No. 427,424, and in Great Britain December 1, 1919. Renewed June 16, 1928.

My invention relates to improvements in gyroscopic navigational apparatus such as gyro-compasses, gyro ground-speed measuring instruments and the like and has for its object the elimination or compensation of the deviations of the gyroscope or of the virtual meridian which are produced by an acceleration of the ship or aircraft upon which the instrument is mounted, such acceleration being due either to change of speed or change of course.

In all such instruments the gyroscope is provided with gravitational control and since the gyroscope cannot differentiate between the force of gravity and any external force accelerating the compass, the gyroscope is necessarily disturbed by the acceleration.

My co-pending Patent 1,707,475, granted April 2, 1929, relates generally to gyroscopic instruments controlled by torques about the vertical axis or about the vertical and horizontal axes in which precessional motion relative to the meridian will be aperiodic, and the instrument is not affected by short period oscillations of the craft on which the compass is mounted. For certain purposes an aperiodic instrument of the type disclosed in that application possesses a greater utility than instruments of the ordinary periodic type.

The present application relates particularly to the compensation for changes for the effect upon the gyroscopic element of changes in course and speed and is applicable to instruments of the aperiodic type disclosed in my co-pending application referred to above as well as instruments, such as gyroscopic compasses, of the periodic type.

My invention consists broadly in supplying the deficiency between the couples acting upon the gyroscope and upon its gravity control system at the end of an acceleration and those required to make the displacements produced by the acceleration combined with the velocity acquired by the acceleration into a new steady state. This deficiency may be either in the nature of applying a couple about the horizontal or vertical trunnion axis or both or it may be in applying an adjustment to the gravity control system to maintain a couple which has been applied automatically by the acceleration, in either case the additional change or adjustment required is proportional to the change of velocity. The adjustment cannot be inherent in the system, that is, it cannot be brought about by the acceleration alone, I may however bring it about automatically by an independent adjustment for velocity. I also compensate the deviation from the meridian preferably by moving the compass card.

My invention consists therefore in providing an adjustment to the gyroscope or its gravity control system to apply to the same, torques proportional to the change of velocity or to maintain torques which have been applied automatically by the acceleration, the adjustment being set either by hand or brought into action automatically by an agent external to the sensitive element of the compass for the purpose of introducing a new steady state in a particular compass.

Attempts have been made previously with gyro-compasses to make the compass move from one steady state to another by means of the acceleration but so far without success. In the periodic compass of the Foucault type the final steady state or resting point is on the virtual meridian, which is perpendicular to the resultant of the speed of the ship round the earth and the peripheral speed of the earth's surface at the place in question due to the earth's rotation about its axis. Thus if $V_n$ be the component northerly speed and $\omega$ be the angular velocity of the earth, $R$, its radius and $\lambda$ the latitude, the deviation of the virtual from the true meridian is $V_n/\omega R \cos \lambda$.

In applying my invention to instruments embodying my system of level control described in my copending United States application, Serial No. 313,537, filed July 26, 1919 and in my United States Patent No. 1,644,921, granted October 11, 1927 I have to differentiate between the control with a level having a fluid of small effective viscosity and that having a fluid of great effective viscosity. All liquids have viscosity, but the viscosity has no effect unless the liquid is placed under constraint, as in a tube, and the viscous effect for any given liquid varies with the constraint or throttling. The viscous effect of a liquid having a high natural viscosity but little constraint may be much less than that of a liquid of low natural viscosity flowing through a very small tube. It is therefore insufficient to consider natural viscosity alone, and I use the term "effective viscosity" to denote the combined effect of natural viscosity and constraint or throttling.

In the case in which I employ a fluid of great effective viscosity in the level, the fluid displaced by the acceleration is proportional to the change of velocity, the gyroscope is displaced very slightly, and the couple introduced may be made just sufficient for the new steady state if it can be maintained. The fluid would flow back at the end of the acceleration but for an adjustment which I introduce to maintain it. This adjustment may be similar to that in the former case. Hence my invention of the adjustment is not always to apply a couple but may be sometimes for the purpose of maintaining a couple introduced by the acceleration.

In regard to the latter type of level control mentioned in the preceding paragraph, the extent to which the flow of fluid has to be restricted in order to eliminate ballistic deflection of the gyroscope in azimuth, that is, in order to make the rate of flow of fluid proportional to the acceleration of the ship along the meridian, depends not only on the level and the fluid, but also on the gyroscope, as its moment of inertia enters into the calculation. For a given gyroscope, however, the desired effect can be attained by suitable arrangement of the level and fluid.

In all cases, however, and irrespective of the gyroscope, the effective viscosity must be sufficiently high to make the flow of fluid in the level aperiodic well beyond the dead-beat stage. This, of course, only refers to cases where ballistic deflection is eliminated by the effective viscosity of the level alone, and not to cases, which I shall mention later, where ballistic deflection in azimuth is greatly reduced by reduction of the gravity control. In the latter case there is no necessity to use high effective viscosity and the level may be periodic, or a pendular control may be used, and if in that case the damping torque is of substantial amount there will be a ballistic tilt but little, or no appreciable, ballistic deflection in azimuth.

I will now describe the application of my invention to a gyroscope embodying my system of level control. The compass may be either periodic or aperiodic, the former differing from the latter in having a large gravity control about the horizontal trunnion axis and a small control about the vertical axis. The illustration applies more directly to the aperiodic arrangement and the minor changes which I prefer to introduce in the periodic arrangement will be described later.

In the accompanying drawings:

Figure 1 is a view in elevation and partly in section of my aperiodic gyro-compass with the present invention applied thereto, the view showing the south side of the compass.

Fig. 2 is a similar view taken at right angles to Fig. 1 and partly in section,

Figs. 3 and 4 are views in elevation and plan, respectively, of portions of the adjusting mechanism, Fig. 5 is a detail view of the mechanism by which the point of attachment of the liquid level device may be adjusted, Fig. 6 is a detail view of the mechanism for shifting the compass card, Fig. 7 is a diagram showing the effect of acceleration upon the aperiodic compass, Fig. 8 is a diagram of the motions of compasses of the periodic and aperiodic types.

Fig. 9 is a north elevation of a compass showing the invention applied to a periodic gyro-compass with pendular control, and Fig. 10 is a detail of one of the trunnions of the instrument of Fig. 9 and the parts associated therewith.

In order more clearly to show the differences between prior compasses and those constructed in accordance with my invention reference may be made to Fig. 8 which represents a small portion of the surface of a sphere the center of which is at the compass. MM' is the intersection of the meridian with the sphere and HH' the intersection with the horizontal plane. O represents the ultimate settling point of a well balanced compass on the meridian when the ship is at anchor. If a periodic compass be set up arbitrarily with its rotor axis at P, it traces out an elliptic orbit A if undamped, and a spiral orbit B if damped. When the ship moves along the meridian with steady speed $V_n$ the meridian virtually changes to NN' and O' becomes the ultimate settling point.

When the ship is accelerated along the meridian the gyroscope is subjected to a couple about the horizontal trunnion axis which produces a ballistic deflection of the rotor axis in azimuth. If this deflection is just sufficient to bring the compass on to the new virtual meridian NN' and O', the gravity control of the gyroscope must be such that the period of elliptic motion in the orbit A is 90 minutes which is the period of a simple pendulum of length equal to the earth's radius. All gyro-compasses now in common use are so designed.

The compass having been brought on to the virtual meridian ballistically does not remain there, unfortunately because of the effect which the acceleration has had on the mechanism employed to damp the elliptic oscillation. This damping is either produced by torques about the vertical axis in phase with the tilt of the gyro or by torques about the horizontal trunnion axis at 90° phase difference with the tilt. In the former case the acceleration tilts the gyroscope ballistically while moving it to the virtual meridian, so that instead of coming to O' it comes to Q and then sets out upon the spiral orbit R and 20 minutes later is considerably deviated from the virtual meridian. In the latter case the damping is produced by the movement of a viscous fluid and the acceleration produces a displacement of viscous fluid from one side of the gyroscope to the other which does not flow back immediately the acceleration ceases, hence the gyroscope precesses slowly away from the virtual meridian on an orbit somewhat similar to R but starting at O' and 20 minutes later has a considerable deviation but comes to rest finally at O'.

If the gyroscope has a direct pendular gravity control it must necessarily have a ballistic deviation due to acceleration and conversely if the gyroscope is to have no ballistic deviation it must have no direct pendular gravity control hence in a gyrocompass if the axis is not to be deflected from O by acceleration of the ship there must be no direct pendular gravity control. This is the case in my aperiodic compass and to keep the rotor axis horizontal after the acceleration has ceased a torque must be applied about the vertical axis sufficient to produce a precession $V_n/R$. I may produce this torque automatically by the acceleration, but to maintain it I require the adjustment in question which is proportional to $V_n$. If in the periodic compass the direct gravity couple be sufficient to move the gyroscope to O' ballistically no torque is required about the vertical axis, the rotor axis being kept horizontal by the rotation of the earth combined with the displacement OO' from the meridian. If the direct gravity control be reduced so that the ballistic deflection is say one half OO', then a torque is required about the vertical axis to keep the rotor axis horizontal the magnitude of the torque being half that required at O.

The motion of the aperiodic compass is also illustrated in Fig. 8. When set up at P it moves by a path C' which is approximately vertical, down on to a straight line path D along which it moves extremely slowly towards O, but at any time its deviation from O can be determined by the tilt of the level, which tilt is proportional to the deviation. In Fig. 7 the effect of acceleration is illustrated. The compass is say at Q on the straight line QO when by acceleration the meridian is virtually changed to NN' and the natural line of steady states changes to Q'O'. When a fluid of small effective viscosity is used in the level I arrange so that the acceleration virtually increases the tilt of the gyroscope to Q' by an amount proportional to OO' so that it may correctly indicate the deviation from the virtual meridian; and to maintain the displacement of the gyroscope in a new steady state virtually corresponding to Q', I adjust the zero of the level by an amount proportional to the velocity acquired. Actually the effect of the acceleration is to tilt the gyroscope down to Q'', as far below Q as Q' is above it, and in order to prevent the gyroscope from subsequently wandering to its new natural position of steady state on Q'O', I adjust the zero of the level in the direction to prevent return flow of the fluid displaced by the acceleration and so as virtually to lower the horizontal plane, so far as the gyro is concerned, by the amount required to apply to the gyro at Q'' the torques which would be applied to it, without the adjustment, at Q'. When I employ a fluid of great effective viscosity, I arrange so that the fluid transferred by the acceleration just suffices to maintain the new steady state, the gyro has remained practically at Q and to keep the fluid from flowing back through the level I move the point of attachment of the level to the following element, so that, so far as the level is concerned, the horizontal plane is virtually lowered to KK' and the gyroscope precesses slowly along QOO'' to O''.

I shall refer now to Figs. 1 and 2 which show incidently the application of my invention to a compass in which no air jet is utilized. In this form the gyroscope in its case 1 is supported on horizontal trunnions 2 and 3 on a vertical gimbal ring 4 which is shown in section in Fig. 2, the whole being supported by the following element 20 which is supported by the four pronged spider 21 which is supported on the gimbal ring 22 in the binnacle. The level consists of two vessels 7 and 8 connected by a fine bore tube 9 to permit interchange of fluid between them. The vessels are connected also by a frame 23 which is supported pivotally by the trunnions 24 and 25 in bearings in two lugs 26 and 27 rigidly attached to the gyro case 1. The level has a wire frame 28 fixed to it which serves to carry the bracket 29 to which two constraining springs 30 and 31 are attached (Fig. 2) the outer ends of the springs being attached to the bracket 32 carried on the following element 20. The bracket 32 is movably mounted in guideways 32' projecting from the following element 20 so that it can be adjusted longitudinally by a screw 33 (Fig. 5) which can be turned by a crank 34, the movement of the crank 34 thus translating the point of attachment of the level to the following element. The crank 34 is turned by the bell crank 35—36 (Fig. 1) which is pivoted on the axis 37 on brackets 38 (Fig. 2) attached to the following element 20. The crank pin 39 engages in a slot in the end of the crank 34 and the roller 40 on the end of the crank 36 engages in a cam 41 which consists of a cylindrical ring of U-shaped section as shown, pivoted upon two trunnions 42 and 43 attached to the spider 21. The plane of the ring can be tilted about the trunnions 42 and 43 by means of the crank 44, the crank 44 being tilted by a screw adjustment which is shown in greater detail in Figs. 3 and 4. The crank 44 has a curved slot 45 along which the crank pin 46 can be adjusted. The connecting rod 48 connects the pin 46 with the pin 49 upon a pillar 50 which is rigidly attached to the spider 21. The pin 49 carries a sleeve 51 which contains a nut 52 which can be turned by the head 53, the position of the nut being indicated upon a dial 54 which is turned by the bevel wheels 55 and 56. The connecting rod is screwed at the end and fits into the nut, so that by turning the head 53 the length of the connecting rod 48 is varied and the crank 44 is thereby tilted. The dial 54 is graduated with the speed of the ship in knots, thus by setting the dial 54 to the speed of the ship by turning the head 53, a tilt is imparted to the ring 41 which is simply proportional to the speed of the ship. The roller 40 engaging with the ring 41 applies to the crank 34 a displacement proportional to the component speed of the ship along the meridian.

It will be understood from the above description that since the level 7—8 is pivoted on the gyro case on trunnions 24—25 which are below the gyro trunnions 2—3 (as in Fig. 1) and the level is constrained by springs 30—31 attached to the following element 20, the horizontal force due to the spring deflection produced by a flow of the fluid in the level due to the tilt of the gyroscope, acts both on the following element and the gyroscope. The following element may be regarded as fixed since it is kept in phase with the gyroscope by the following motor (not shown).

The spring force on the bracket 29 is transmitted to the gyroscope through the wire frame 28, the level 7, 8, 9 and the level pivots 24—25. The moment of the force about the pivots 24—25 supports the weight of the fluid which is displaced from one side of the level to the other. The lateral pressure on the pivots 24—25 produces a couple on the gyroscope about the trunnion 2—3 tending to increase the tilt. This is the only direct gravity control in the aperiodic compass and the gyroscope is rotated in the opposite sense to the earth to make a stable compass.

The force on bracket 29 has also a moment about the central vertical axis due to the fact that the spring connection to the level is at a point considerably off the vertical central axis. This torque is transmitted to the gyroscope through the trunnions 24—25 and causes the gyroscope to precess in opposite phase to the tilt of the level thus tending to annul that tilt.

To compensate the change in the position of the virtual meridian I turn the compass card 60 relatively to the following element 20 through an angle proportional to the tilt of the crank 36 and inversely proportional to the cosine of the latitude. To obtain this motion I thread the central portion of the spindle 37 and mount on it a nut 61 (Figs. 2 and 6) which is translated axially along the spindle 37 as the crank 36 is rotated. A pin 62 (Fig. 6) connected to the nut 61 engages in a slot in the card 80 and turns it through an angle proportional to the tilt of the crank 36 which is proportional to the component velocity along the meridian. This pin 62 is adjustable radially on the compass card and is shown in Fig. 6, the radial adjustment being made by the screw 62a by turning the head 62b, the nut 62c carrying the pin 62 being thus translated radially relatively to the compass card 60, its position being marked on a scale graduated in latitude.

I indicate the tilt of the level relatively to the gyro case which in the aperiodic compass indicates the deviation of the compass from the meridian, by means of a circular scale 63 which is fixed on an axis 64 mounted in pivots on the bracket 65 attached to the gyro case. A light rod 66 has its lower end resting in a hole in the cap of the vessel 7 and its upper end is guided in a hole in the bracket 65. A cord 67 (Fig. 2) is attached to this rod by a hook 68, then passes round the barrel 69 on the spindle 64 and it then has its lower end attached by means of a spring 70 to a hook 71 on the rod 66. The vertical motion of the rod 66 therefore turns the dial 63 and the position of the level is indicated by the reading of the pointer 72 which is attached to the gyro case at the edge of the dial 63.

Alternatively I may indicate the tilt of the level by employing a level containing two fluids the surface of separation between the fluids serving to indicate the tilt in a manner well known in the art.

The gyroscope and level having been carefully balanced the compass is set up arbitrarily with the gyro axis horizontal and the level horizontal. It is then left to itself for a period of about one hour by which time if aperiodic it has reached a steady state on the line QO (Fig. 7). Assuming that the meridian is not known, the tilt of the level relatively to the gyroscope as indicated on the dial 63 gives the deviation from the meridian. Since the tilt is proportional to the sine of the deviation the dial 63 is graduated in sines and will indicate either the true deviation or its supplement. To determine which is indicated it is sufficient to note whether the tilt is increasing or decreasing; if the former it is the supplement which is indicated and if the latter the deviation itself is indicated.

The gyroscope may then be precessed round in azimuth through an angle equal to the deviation, say by hanging a weight temporarily on one end of the gyro axis, and may then be left to itself for another period of about one hour when it will have again settled down to the steady state very near the meridian.

If the meridian is known and if it be found that when the compass is on the meridian the dial 63 still indicates a deviation, a correction can be applied by turning the screwed spindle 33 relatively to the crank 34, the crank being only frictionally attached to the spindle.

If the ship be now accelerated along the meridian to the north to a speed $V_n$ the acceleration produces a flow of fluid in the level towards the S. side of the gyroscope and the mass of fluid thus transferred is proportional to the speed $V_n$ when a fluid of high effective viscosity is used.

The level is now out of balance producing a couple about the vertical and this couple I arrange by throttling the flow in the level, to be just sufficient to produce the angular velocity $V_n/R$. To maintain this steady state the fluid must be prevented from flowing back through the level when the acceleration ceases. This I do by displacing the crank 34 by turning the head 53 until the dial 54 indicates the speed $V_n$. This displacement moves the point of anchorage of the level to the following element and is virtually equivalent, so far as the fluid is concerned, to a displacement of the horizontal plane from HH' to KK' in Fig. 7.

The level has acquired a tilt relatively to the gyroscope due to the acceleration and the applied adjustment and this tilt, as indicated on the dial 63, indicates the deviation of the rotor axis of the compass from the virtual meridian. The compass card has however been turned by the tilting of the ring 41 which takes place in setting the dial 54 by an amount equal to the deflection of the virtual meridian. I set the lubber line by the usual hand adjustment, to a reading corresponding to the tilt of the level as indicated on the dial 63 and the scale for the displacement of the line is graduated so that the indication of the compass is then correct in relation to the real meridian, both the deviation of the compass and the deviation of the virtual from the true meridian being completely compensated.

If a tilt of the gyroscope is produced by the damping mechanism during the acceleration thereby introducing a corresponding couple about the horizontal trunnion axis proportional to the velocity acquired, then I apply to that compass an adjustment to annul that couple, either by introducing an equal and opposite one or by annulling the arm of the couple either by suitable adjustment of the trunnion pivots of the gyroscope or the pivots of the gravity control system.

In the Sperry compass of the general type shown in United States Patent No. 1,279,471 granted September 17, 1918 for example, the gravity control is due to a bail weight pivoted on the following element and connected to the gyroscope case by an eccentric pin, the eccentricity providing the damping couples about the vertical axis. An acceleration along the meridian to the north produces both a couple round the horizontal trunnion axis which deflects the rotor axis from O to O' and a couple about the vertical trunnion axis which tilts the rotor axis to Q. (Fig. 8). I find from a mathematical investigation of the equations of motion of this compass that in order to establish a steady state at the end of an acceleration I have merely to alter the zero of the bail weight by an amount proportional to the velocity gained thereby varying the couples about both the horizontal and vertical trunnion axes. The adjustment required is very approximately just sufficient to cancel the couple about the horizontal axis due to the tilt produced by the acceleration. The automatic compensation also necessitates a small change in the gravity control and the period.

In order to apply this adjustment I move one or more of the pivots of the bail weight horizontally by an eccentric in a manner similar to that employed by Sperry for a latitude correction, but I made the adjustment automatically by means of a cam in a manner to be described.

Figs. 9 and 10 show an application of the invention to a periodic compass of the general type shown in the above mentioned patent. This compass is very similar in general arrangement to that shown in Figs. 1 and 2 except that the gravity control is effected by a bail weight 10 pivoted on trunnions 11 and 12 supported on the ring 20 coaxial with the trunnions 2–3. The trunnion 11 has a horizontal adjustment for latitude by means of an eccentric in order to apply to the gyro case a torque about the horizontal trunnions proportional to sin λ sufficient to produce a precession round the vertical equal to ω sin λ, so as to keep the rotor axis horizontal at all latitudes when settled on the meridian. The gravity control of the bail weight 10 is conveyed to the gyro case 1 by twin rollers 13 engaging in guides 14 and 15 carried respectively by the case and bail weight, the position of the rollers 13 being stabilized eccentrically to the central vertical axis of the gyro by an auxiliary gyroscope 16 suspended universally from the gyro case, the eccentricity of the rollers producing both a gravity torque about the horizontal axis 2—3 and a damping torque about the vertical axis.

In applying my invention to this compass I support the pivot 12 of the bail weight on a nut 32a which replaces the bracket 32 of Fig. 5 and is similarly actuated, the pitch of the screw 33 being suitably chosen to impart to the trunnion 12 the proper horizontal displacement to establish a new steady state at the end of an acceleration. Instead of the screw 33 I may employ an eccentric similar to that used in this compass for the adjustment of the pivot 11 to compensate for latitude. The remaining adjustments in Figs. 9 and 10 are similar to those already described above and illustrated in Figs. 1, 2, 3, 4, and 6 except that I show in Fig. 9 the ring 41 controlled from the ship's log 73 by means of a follow-up motor 74, which drives a worm 75 meshing with a worm sector 76 carried on the arm 77 rigidly attached to the trunnion 43 of the cam ring 41.

The gyroscope is deflected on to the virtual meridian by the acceleration and I compensate this deviation by moving the compass card back through the angle $V_n/\omega R \cos \lambda$ by means of the pin 62 engaging in the slot in the card 60, the pitch of the screw 37 being suitably chosen. The crank 36 is turned by the cam 41 through an angle proportional to $V_n$ since the cam is tilted by the motor 74, gearing 75, 76 and arm 77 through an angle proportional to V the speed of the ship. The nut 61 thus moves along the screwed spindle 37 a distance proportional to $V_n$ and the pin 62 is adjusted by the screw 62$a$, so that its distance from the centre of the card is proportional to $\cos \lambda$, so that the angular displacement of the pin 62 relatively to the centre of the compass card is proportional to $V_n/\cos \lambda$ and is made equal to $V_n/\omega R \cos \lambda$.

In one arrangement of my own periodic compass as described in my United States application Serial No. 313,537 referred to above and illustrated in Figs. 14 and 15 thereof, I control the gyroscope by a level pivoted upon trunnions attached to the ring 20 coaxial with the trunnions 2 and 3 and I connect the level to a pin fixed eccentric on the gyro case. I rotate the gyro rotor in the opposite sense to the earth. In applying my present invention to this compass I attach one of the trunnions of the level to the bracket 32 just as described above in connection with the Sperry bail weight. I prefer to employ a fluid in the level of just sufficient viscosity to eliminate the deviation of the compass due to rolling of the ship on intercardinal courses. The level therefore has time to respond to the acceleration due to change of course or speed and behaves in this respect approximately like an inverted pendulum. The gyroscope is therefore subject to the same deviations due to acceleration as the Sperry gyroscope with its bail weight control and the compensation is therefore similar in all respects except that the small changes of period required in the two compasses have opposite signs. The description given above of my method of compensating the Sperry compass applies equally to my own periodic compass with level control of small effective viscosity.

It will be noticed that the dial 54 has to be set to the speed of the ship by hand and in this respect the compensation is not automatic. When I desire to make it entirely automatic I turn the head 53 by means of a receiver controlled from a transmitter on the ship's log, as shown in Fig. 9. The whole compensation of the deviations of the compass due to acceleration produced either by change of course or change of speed is then carried out entirely automatically. The compass card then indicates the true meridian at all times and no oscillation is set up by a change of course or speed.

In any level consisting of two vessels connected by a tube of smaller cross-sectional area than the vessels, the rate of fall of head of the fluid depends on the relative diameters of the vessels and tube, the length of the tube, the presence or absence of sharp bends, the distances between centres of the two vessels, and on the natural viscosity of the particular fluid employed. For a given gyroscope and a given fluid, however, the dimensions and separation of the vessels are determined by the amount of gravity control required to produce a particular period of oscillation of the compass, while the length of the tube is, as a rule, fixed by considerations of design and not capable of great variation, so that in regulating the rate of flow the most convenient, and possibly the only, variable is the bore of the tube. Conversely, for a given gyro and a given level, the most convenient variable is the fluid itself.

It is therefore evident that no hard and fast rule can be laid down, but as an indication of an arrangement which I have successfully used, the result in question was attained in a periodic gyro compass by using mercury in a level of which the two vessels were of 1 inch internal diameter, 10.5 inches between centres, the connecting tube being 22 inches long with no sharp bends and having an internal bore of 1 mm. diameter throughout, the gyroscope employed having an angular momentum of 6280 lbs. feet$^2$ per second. The level was connected to the gyro case by springs as shown in my British Patent No. 166,570, the tension of the springs being adjusted so that the static tilt of the level was twice the tilt of the gyro rotor axis.

The above description has been applied to gyro-compasses but the same method of compensation is applicable to all gyroscopic instruments for use on board ship which have gravity control. It is easy to calculate the changes of conditions which are introduced by an acceleration and also the additional couples which are required to establish a new steady state. The best arrangement for introducing these couples has to be considered in connection with the detailed design of the instrument in question.

I claim:—

1. In a gyroscopic compass, a gyroscope, a following system on which the gyroscope is mounted, a torque applying device connected to the gyroscope and to the system, a member adapted to be displaced in accordance with the meridional component of the speed of the craft and means actuated by the displacement of the member for positioning the point of connection between the device and the system in accordance with such component.

2. In a gyroscopic apparatus for use on a moving craft, a gyroscopic element, a support therefor, a torque-applying device on the element, connections between the device and the support for applying directive and damping torques to the element in a ratio to produce aperiodic motion of the element, a member adapted to be displaced in accordance with a predetermined component of the velocity of translation of the gyroscope and means actuated by the displacement of the member for adjusting the connection between the device and the support to eliminate the effect on the element of changes in such velocity.

3. In gyroscopic apparatus for use on a moving craft, a gyroscope, a torque applying device for the gyroscope, a connection between the device and the gyroscope including relatively displaceable members, means adjustable in accordance with a predetermined component of the velocity of translation of the gyroscope, and a connection between said means and one of the members for causing relative displacement between the members to maintain the device in any position to which it has been displaced by changes in the velocity of translation of the gyroscope.

4. In a gyroscopic apparatus for use on a moving craft, a gyroscope, supporting means for the gyroscope, a level containing viscous liquid and consisting of a pair of vessels connected by a small bore tube for restricting the flow of liquid from one vessel to another caused by a change in the component velocity of translation of the gyroscope in the direction of said flow in proportion to such change, means for pivotally mounting the level on the gyroscope, a connection between the level and the supporting means having a displaceable point of attachment to the latter, a member adapted to be displaced in accordance with the velocity of translation of the gyroscope and means actuated by the member for positioning the point of attachment in accordance with such velocity to maintain the level in the position to which it has been displaced by a change in velocity of translation of the gyroscope.

5. In a gyroscopic compass, a gyroscope, a following system on which the gyroscope is mounted, a support for the system, a device connected to the gyroscope for applying directive and damping torques thereto, a connection between the following system and the device including elements connected to the system and to the device and having a shiftable point of connection between them, a member adapted to be displaced in accordance with the angular relation between the system and the support and in accordance with the speed of the craft, and means actuated by the member and connected to one of the elements for positioning the point of connection between the elements in accordance with changes in said relation and speed to produce a new steady state of the gyroscope following such changes.

6. In gyroscopic apparatus for use on a moving craft, a gyroscopic element, a following element, a support therefor adapted to be attached to the craft, a device attached to the gyroscopic element and movably connected to the following element for applying directive and damping torques to the gyroscopic element, a cam member movably mounted on the support, means for shifting the cam member in accordance with the speed of the craft, mechanism connected to the following element and operatively related to the cam member, and means actuated by the mechanism whereby the point of connection of the device to the following element is shifted in accordance with the changes in the meridional component of the speed of the craft to produce a new steady state of the gyroscope following such changes.

7. In gyroscopic apparatus for use on a moving craft, a gyroscope, a level pivoted on the gyroscope and consisting of a pair of vessels connected by a tube of such bore and containing a fluid of such viscosity that the flow from one vessel to another caused by a change in the component velocity of translation of the gyroscope in the direction of said flow is proportional to such a change and produces corresponding displacement of the level and means adjustable in accordance with such a change for maintaining such displacement of the level after such a change has occurred.

8. In a gyroscopic compass, a gyroscope, a following element on which the gyroscope is mounted, a liquid level torque applying device pivoted on the gyroscope, a member movably mounted on the element, a resilient connection between the member and the device, a member adapted to be displaced in accordance with the meridional component of the speed of the craft, and connections between the members for shifting the first named member to position the point of connection between the device and the element in accordance with such component to produce a new steady state of the gyroscope after such a change in speed.

9. In gyroscopic apparatus for use on a moving craft, a gyroscope, a case in which the gyroscope is mounted, and a level pivoted on the case and consisting of a pair of vessels connected by a tube of such bore and containing a fluid of such viscosity that the flow from one vessel to another caused by a change in the component velocity of translation of the gyroscope in the direction of said flow is proportional to such a change.

10. In a gyroscopic compass, a gyroscope, a following system on which the gyroscope is mounted, an azimuth indicator including a compass card movably mounted on the system, a device for applying torques to the gyroscope, including elements connected to the gyroscope and to the system, one of said elements being shiftable, a member displaceable in accordance with a function of the meridional component of the speed of the craft on which the compass is mounted, means operable by said member and connected to said shiftable element for positioning the same in accordance with such changes and means connected to the compass card and actuated by said means for displacing the card to compensate for the change in the virtual meridian due to changes in the meridional component of the speed of the craft.

11. In a gyroscopic apparatus for use on a moving craft, a gyroscope, supporting means for the gyroscope including substantially horizontal trunnions, and a level connected to the gyroscope for movement relative thereto about an axis parallel to the trunnions, said level containing viscous liquid and consisting of a pair of vessels connected by a small bore tube, said level being so constructed that the flow of liquid from one vessel to the other produced by a change of speed of the craft along the meridian is aperiodic and of an amount substantially proportional to said change whereby ballistic deflection of the gyroscope is prevented.

12. In a gyroscopic compass for use on a craft, the combination of a gyroscope pivoted on horizontal trunnions, a follow-up element, a torque-applying device pivoted on the follow-up element on horizontal trunnions normally coaxial with the trunnions of the gyroscope, a connection between said device and gyroscope whereby they tilt together about their respective trunnions, a member adapted to be displaced in accordance with the meridional component of the speed of the craft, and means actuated by displacement of the said member for shifting the trunnion axis of the device relatively to the trunnion axis of the gyroscope.

Dated this 18th day of October, 1920.

JAMES BLACKLOCK HENDERSON.